US012613503B2

(12) United States Patent
Matei et al.

(10) Patent No.: US 12,613,503 B2
(45) Date of Patent: Apr. 28, 2026

(54) TECHNIQUES FOR SOLVING ADDITIVE MANUFACTURING PART ANALYSES FOR POWDER BED FUSION TECHNOLOGIES

(71) Applicant: ANSYS, INC., Canonsburg, PA (US)

(72) Inventors: Alexandre Matei, Canonsburg, PA (US); Enrique Escobar, Munich (DE)

(73) Assignee: ANSYS, INC., Canonsburg, PA (US)

( * ) Notice: Subject to any disclaimer, the term of this patent is extended or adjusted under 35 U.S.C. 154(b) by 494 days.

(21) Appl. No.: 18/151,913

(22) Filed: Jan. 9, 2023

(65) Prior Publication Data

US 2024/0231290 A1      Jul. 11, 2024

(51) Int. Cl.
| | |
|---|---|
| *B33Y 50/00* | (2015.01) |
| *B22F 10/80* | (2021.01) |
| *B29C 64/386* | (2017.01) |
| *G05B 13/04* | (2006.01) |
| *B22F 10/28* | (2021.01) |
| *B29C 64/153* | (2017.01) |
| *B33Y 10/00* | (2015.01) |

(52) U.S. Cl.
CPC ............ *G05B 13/042* (2013.01); *B22F 10/80* (2021.01); *B29C 64/386* (2017.08); *B33Y 50/00* (2014.12); *B22F 10/28* (2021.01); *B29C 64/153* (2017.08)

(58) Field of Classification Search
CPC ........ G05B 13/042; B22F 10/80; B22F 10/28; B29C 64/386; B29C 64/153; B33Y 50/00; B33Y 30/00; B33Y 10/00; G06F 30/23; G06F 2113/10; G06F 2119/08

USPC .......................................................... 700/98
See application file for complete search history.

(56) References Cited

U.S. PATENT DOCUMENTS

2004/0230411 A1* 11/2004 Zheng ................. B29C 45/7693
                                                                    703/2
2019/0076925 A1*  3/2019 Lakshman .............. B22F 10/80
                  (Continued)

OTHER PUBLICATIONS

Cooper, K., et al., "Contact-Free Support Structures for Part Overhangs in Powder-Bed Metal Additive Manufacturing," Inventions 2018, 3(1), 2; https://doi.org/10.3390/inventions3010002.
                  (Continued)

*Primary Examiner* — Michael J Brown
(74) *Attorney, Agent, or Firm* — WOMBLE BOND DICKINSON (US) LLP

(57) ABSTRACT

This disclosure provides modelling techniques for accurately and reliably analyzing printed parts. More specifically, a model with a powder representation may be used for the thermal analysis, the powder representation may then be removed from the model for performing the structural analysis. Although the powder representation is removed from the model for the structural analysis, the structural analysis still factors in the thermal effects of the powder on the part determined by the thermal analysis. The computer-based techniques of the current disclosure improve the functioning of a computer system as compared to conventional approaches by facilitating analyses (e.g., thermal, mechanical, design, and heat treatment analyses) that are more accurate, more efficient (e.g., faster, smaller memory requirements, etcetera), and/or have a reduced processing burden versus conventional approaches.

20 Claims, 16 Drawing Sheets

(56) References Cited

U.S. PATENT DOCUMENTS

2020/0410061  A1 *   12/2020   Raghavan  ............. B29C 64/386
2024/0157447  A1 *    5/2024   Schwab  .................. B22F 12/90

OTHER PUBLICATIONS

Çelik, A., et al., "Contact-Free Support Structures for the Direct Metal Laser Melting Process", Materials 2022, 15, 3765. https://doi.org/10.3390/ma15113765.

* cited by examiner

100a

RECEIVE DATA FOR A DESIGN OF ONE OR MORE PHYSICAL PARTS 102

PERFORM ONE OR MORE ANALYSES/SIMULATIONS 104

EVALUATE THE RESULTS OF THE ONE OR MORE ANALYSES/SIMULATIONS 106

CURRENT DESIGN SATISFY DESIRED CRITERIA FOR PHYSICAL PART? 108

NO

REVISE DESIGN 110

YES

PROVIDE DATA ABOUT PHYSICAL PART TO FABRICATE THE PHYSICAL PART 112

402a

402b

500

RECEIVE INPUT 502

↓

SETUP SIMULATION 504

↓

CREATE COMPONENT REPRESENTATIONS 506

↓

CREATE CONTACT DEFINITIONS 508

↓

PERFORM THERMAL ANALYSIS 510

↓

REMOVE POWDER REPRESENTATION 512

↓

PERFORM STRUCTURAL ANALYSIS 514

602

604a

604b

606

608

604a

610

604b

608

612

614

702

704

716

706

708

710

712

714a

714b

802

806

804

808

810

Temperature
Type: Temperature
Unit: °C
Time: 1213.3 s
Max: 479.65
Min: 469.6
23/09/2022 22:16

479.65
478.53
477.42
476.3
475.19
474.07
472.95
471.83
470.71
469.6

TECHNIQUES FOR SOLVING ADDITIVE MANUFACTURING PART ANALYSES FOR POWDER BED FUSION TECHNOLOGIES

FIELD

The present disclosure relates generally to devices, systems, and methods for solving additive manufacturing part analyses for powder bed fusion technologies.

BACKGROUND

Additive manufacturing refers to the construction of a three-dimensional object from a computer-aided design (CAD) model. Additive manufacturing can be done with a variety of processes in which material is deposited, joined, or solidified under computer control, with material being added together (such as plastics, liquids or powder grains being fused), typically layer by layer. Powder bed fusion (PBF) is an additive manufacturing technique that uses selective fusing of materials in a granular bed. Typically, the technique fuses parts of a layer and then moves upward in the working area, adding another layer of granules and repeating the process until the piece has built up. Oftentimes various analyses of CAD models are performed prior to construction of the corresponding three-dimensional object (or part). These analyses are used in an effort to avoid constructing parts that fail various design objectives.

SUMMARY

Computer-implemented systems and methods for using a model with a powder representation for a thermal analysis of a part and using a model without a powder representation for a structural analysis of the part are described herein. In one aspect, a computer-implemented method includes performing a thermal analysis for simulated additive manufacturing of a physical part from a physical powder using powder bed fusion (PBF). The thermal analysis may be based on a model of the PBF. The model may include representations of the physical part printed from the physical powder and remaining physical powder not yet printed in the simulated additive manufacturing. The thermal analysis may provide thermal characteristics for the physical part. The model may be updated without including the remaining physical powder not yet printed. The updated model of the PBF may include a representation of the physical part associated with the thermal characteristics. A structural analysis may be performed for the physical part associated with the thermal characteristics utilizing the updated model to determine structural properties of the physical part.

Some embodiments include setting one or more manufacturing parameters for actual additive manufacturing of the physical part from the physical powder using PBF based on the structural analysis. In some such embodiments, the physical part comprises a first physical part and the one or more manufacturing parameters set for actual additive manufacturing of the physical part includes a spacing between the first physical part and a second physical part additively manufactured with the first physical part. In various such embodiments, the one or more manufacturing parameters set for actual additive manufacturing of the physical part includes a thickness of a contactless support, wherein the contactless support is composed of a portion of the physical powder. In many embodiments, the structural analysis is performed based on at least a portion of results from the thermal analysis. In many such embodiments, the portion of results from the thermal analysis includes thermal loads experienced by the representation of the physical part during the simulated additive manufacturing of the physical part. In several embodiments, the representation of the remaining physical powder comprises a mesh representation and the mesh representation is removed in updating the model. In various embodiments, the updated model includes the representation of the physical part printed from the physical powder.

According to another aspect of the present disclosure, an apparatus includes a memory storing instructions and one or more processors coupled to the memory, the one or more processors executing the instructions from the memory, the one or more processor configured to perform a method. In performing the method, a thermal analysis for simulated additive manufacturing of a physical part from a physical powder using powder bed fusion (PBF) may be performed. The thermal analysis may be based on a model of the PBF. The model may include representations of the physical part printed from the physical powder and remaining physical powder not yet printed in the simulated additive manufacturing. The thermal analysis may provide thermal characteristics for the physical part. The model may be updated without including the remaining physical powder not yet printed. The updated model of the PBF may include a representation of the physical part associated with the thermal characteristics. A structural analysis may be performed for the physical part associated with the thermal characteristics utilizing the updated model to determine structural properties of the physical part.

Many embodiments include setting one or more manufacturing parameters for actual additive manufacturing of the physical part from the physical powder using PBF based on the structural analysis. In many such embodiments, the physical part comprises a first physical part and the one or more manufacturing parameters set for actual additive manufacturing of the physical part includes a spacing between the first physical part and a second physical part additively manufactured with the first physical part. In some such embodiments, the one or more manufacturing parameters set for actual additive manufacturing of the physical part includes a thickness of a contactless support, wherein the contactless support is composed of a portion of the physical powder. In many embodiments, the structural analysis is performed based on at least a portion of results from the thermal analysis. In many such embodiments, the portion of results from the thermal analysis includes thermal loads experienced by the representation of the physical part during the simulated additive manufacturing of the physical part. In several embodiments, the representation of the remaining physical powder comprises a mesh representation and the mesh representation is removed in updating the model. In various embodiments, the updated model includes the representation of the physical part printed from the physical powder.

According to another aspect of the present disclosure, a non-transitory machine-readable medium storing executable program instructions which when executed by a data processing system causes the data processing system to perform a method. In performing the method, a thermal analysis for simulated additive manufacturing of a physical part from a physical powder using powder bed fusion (PBF) may be performed. The thermal analysis may be based on a model of the PBF. The model may include representations of the physical part printed from the physical powder and remaining physical powder not yet printed in the simulated additive manufacturing. The thermal analysis may provide thermal characteristics for the physical part. The model may be updated without including the remaining physical powder not yet printed. The updated model of the PBF may include a representation of the physical part associated with the thermal characteristics. A structural analysis may be performed for the physical part associated with the thermal characteristics utilizing the updated model to determine structural properties of the physical part.

Several embodiments include setting one or more manufacturing parameters for actual additive manufacturing of the physical part from the physical powder using PBF based on the structural analysis. In many such embodiments, the physical part comprises a first physical part and the one or more manufacturing parameters set for actual additive manufacturing of the physical part includes a spacing between the first physical part and a second physical part additively manufactured with the first physical part. In several such embodiments, the one or more manufacturing parameters set for actual additive manufacturing of the physical part includes a thickness of a contactless support, wherein the contactless support is composed of a portion of the physical powder. In some embodiments, the structural analysis is performed based on at least a portion of results from the thermal analysis. In some such embodiments, the portion of results from the thermal analysis includes thermal loads experienced by the representation of the physical part during the simulated additive manufacturing of the physical part. In several embodiments, the representation of the remaining physical powder comprises a mesh representation and the mesh representation is removed in updating the model. In various embodiments, the updated model includes the representation of the physical part printed from the physical powder.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The current disclosure is illustrated by way of example and not limitation in the figures of the accompanying drawings in which like references indicate similar elements. To easily identify the discussion of any particular element or act, the most significant digit or digits in a reference number refer to the figure number in which that element is first introduced.

DETAILED DESCRIPTION

Figure 1A:
FIG. 1A illustrates a logic flow which can be used according to one or more embodiments described hereby to design or evaluate a part using a simulation system.

Computer-implemented systems and methods for using a model with a powder representation for a thermal analysis of a part and using a model without a powder representation for a structural analysis of the part are described herein. The subject matter described hereby provides many technical advantages. For instance, as described in more detail below, the computer-based techniques of the current disclosure improve the functioning of a computer system as compared to conventional approaches because the techniques support analyses (e.g., thermal, and structural analyses) that are more accurate, more efficient (e.g., faster, smaller memory requirements, etcetera), and/or have a reduced processing burden versus conventional approaches.

More generally, thermal analysis of a part may simulate manufacturing of the part, which can allow the thermal analysis to accurately account for the thermal conditions the part is subjected to during manufacturing (e.g., hot spots). A structural analysis, on the other hand, may simulate applying various forces to the part, which can allow the structural analysis to accurately project the behavior of the part in response to application of the forces (e.g., stressing, bending, breaking, etcetera). However, the thermal conditions the part is subjected to can have a significant effect on the behavior of the part in response to the application of forces. Therefore, accurate and reliable thermal analyses are typically necessary for accurate and reliable structural analyses.

With powder bed fusion technology, an accurate and reliable thermal analysis needs to account for the thermal effects of the powder surrounding the part and from which the part is manufactured. Thus, performing thermal analysis of a part using a model with a powder representation is important to enable the thermal analysis to account for the thermal effects of the powder (e.g., insulative properties). However, simulating a model with a powder representation is considerably more resource intensive than simulating a model without a powder representation, and in structural analyses, while taking into account the thermal effects of the powder during the manufacturing of the part may be critical, it is not necessary to utilize a model with a powder representation. In fact, in addition to considerably increasing the necessary compute resources, including a powder representation in a model for a structural analysis can skew the results, such as by over stiffening the structural behavior of the parts. Accordingly, various embodiments disclosed hereby utilize a model with a powder representation for performing thermal analyses and a model without a powder representation for performing structural analyses that still account for the thermal effects of the powder on the part from the thermal analyses.

The results of the thermal and/or structural analyses of a part may be utilized to improve/refine the part and/or manufacturing process prior to producing the physical part. For example, scanning strategies and/or build chamber conditions may be adjusted based on the analyses. In another example, one or more of a proximity between parts, supports designs (e.g., contactless support and support-free designs), process parameters, and part nesting may be improved or optimized based on the analyses.

The computer-based techniques of the current disclosure can improve additive manufacturing simulations using powder bed fusion technology because it enables accurate, reliable, and efficient analyses without the need for CAD manipulation. As a result, the proposed method is applicable to a variety of additive manufacturing analyses (e.g., powder bed fusion, inherent strains, sintering, binder jetting, etcetera). Embodiments described hereby can be practically utilized to improve the functioning of a computer and/or to improve the technical field of model simulation and analysis, such as model analysis for simulated additive manufacturing using powder bed fusion technology.

The computer-based techniques described herein achieve many such improvements through the use of processes that transforms an initial model into an updated model. The computer-based techniques of the current disclosure transform an initial model into a different state by removing powder representations to produce an updated model. Further, the transformation changes a set of physical bits representing the initial model into another set of physical bits representing the updated model. Further, the powder representations are removed without need for CAD manipulation because the powder representation can simply be removed from the model used for the thermal analysis, which results in a more adaptable system that doesn't require a CAD manipulator.

By performing a thermal analysis using a model with a powder representation and then performing a structural analysis using a model without a powder representation but that still takes results of the thermal analysis into account, issues in thermomechanical modeling can be avoided and the structural analysis can be accurately and reliably performed in an efficient manner that is faster and/or requires smaller memory or processing resources as compared to conventional approaches.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily refer to the same embodiment. The processes depicted in the figures that follow are performed by processing logic that comprises hardware (e.g., circuitry, dedicated logic, etcetera), software, or a combination of both. Although the processes are described below in terms of some sequential operations, it should be appreciated that some of the operations described may be performed in a different order. Moreover, some operations may be performed in parallel rather than sequentially.

In additive manufacturing using powder bed fusion technology, one or more three-dimensional parts may be manufactured layer by layer, such as by scanning a laser over the powder until the final part is created. In the additive manufacturing process, there are many parameters that could have an influence in the quality of the final printed parts. Some of these parameters include process parameters, scanning strategies, and build chamber conditions.

Different modelling techniques can be used to predict defects associated with the printed parts. Thermomechanical (TM) modeling is one existing technique for thermal analysis that simulates the thermal history of the parts. TM modeling generally refers to a one-way coupling between a thermal and a structural analysis. Many existing TM approaches utilize assumptions and generalizations that result in inaccurate thermal analyses, such as when parts are too close to each other on the baseplate and/or when powder regions are overheated during manufacturing (e.g., hot spots). For example, thermomechanical (TM) modeling using a lumped layer approach is a common existing techniques for thermal analysis that simulates the thermal history of the parts. However, this approach does not model laser paths, instead, several powder layers are embedded in a macro layer and each layer is activated either with temperature or energy. The accuracy and reliability of these approaches are insufficient to reliably evaluate one or more of hotspots due to proximity between parts, contactless support designs, support-free designs, powder insulation effects in heat treated parts, optimization of process parameters, and part nesting. On the other hand, existing approaches that model the powder as a body are impractical. For example, using a powder representation in macroscale simulations considerably increases the degrees of freedom, leading to excessive computing resource demands and unacceptable computational times. In another example, using a powder representation for structural analyses result in overstiffened structural behavior of the parts.

Accordingly, the subject matter disclosed hereby provides modelling techniques for accurately and reliably analyzing printed parts. More specifically, in various embodiments, a model with a powder representation may be used for the thermal analysis, the model may then be manipulated for performing the structural analysis, such as by removing the powder representation from the model. In many embodiments, the thermal analysis includes a transient thermal calculation. Further, although the powder representation is removed from the model for the structural analysis, the structural analysis still factors in the thermal effects of the powder on the part determined by the thermal analysis. As described in more detail below, the computer-based techniques of the current disclosure improve the functioning of a computer system as compared to conventional approaches because the techniques described herein support analyses (e.g., thermal, mechanical, design, and heat treatment analyses) that are more accurate, more efficient (e.g., faster, smaller memory requirements, etcetera), and/or have a reduced processing burden versus conventional approaches. For example, the techniques disclosed hereby can used to reliably, efficiently, and effectively evaluate one or more of hotspots due to proximity between parts, contactless support designs, support-free designs, powder insulation effects in heat treated parts, optimization of process parameters, and part nesting.

The embodiments described herein can be used in computer simulations of various different physical systems and physical objects (for example, parts manufacturing, application of loads, deformations, stresses, heat transfer, heat treatment, parts manufacturing, rotating machinery,) in order to determine whether a particular design of the system or object satisfies particular requirements for the system of object. For example, there might be certain design requirements related to physical strength of a part manufactured using powder bed fusion technology, and one physics simulation or several multiphysics simulations (e.g., thermal analysis, structural analysis, post-manufacturing process analysis) can be used to determine whether a particular design satisfies those design requirements.

In several embodiments, the computer simulations can be utilized to anticipate and/or avoid defects introduced by the three-dimensional printing process. For example, part deformation that makes a part out of specifications can be anticipated through simulations. In some such examples, the part deformation can be resolved by pre-deforming the initial CAD file to account for the residual process deformation (referred to as distortion compensation). For example, the structural design of an object to be manufactured can be adjusted or updated to accommodate the simulated distortion. In another example, material of a part may cause defects, such as with porosity, that can be anticipated and evaluated through simulations. As a result, material parameters of the object to be manufactured can be changed according to the physical characteristics identified from the simulation. In various such examples, better additive manufacturing process parameters may be determined through the simulations to avoid the defects. Such process parameters may include, for example, layer thickness, hatch spacing, laser power, laser speed, scan strategy, cooling time between each new layer or other applicable additive manufacturing control parameters. The disclosed simulation may be performed as part of an additive manufacturing process. In yet another example, the thermal gradient may lead to build failure during printing, such as due to cracks, which can be anticipated through simulations. In many such examples, simulations can be utilized to adjust different design/manufacture configurations without the cost of real experimentation.

To perform certain analyses of a computer-based model (e.g., finite element analysis, etcetera), a mesh representation of the model may be generated (e.g., a polygonal mesh representation). As referred to herein, a polygonal mesh representation is a piecewise discretization of a given model (e.g., a given CAD model). The polygonal mesh representation may comprise, for instance, a Cartesian mesh or other type of mesh, and various computer-based analyses can be performed using the mesh.

In several embodiments, the simulation setup will include all parts that are printed with the process parameters for an entire build. The thermal analysis may include a transient thermal calculation that includes all parts and powder representations. By considering the thermal loads of all model components (including powder), assumptions are not needed in the calculation of the thermal loads. Further, the structural analysis uses the same representations (e.g., meshes) used for the transient thermal calculation but excluding the powder representation (e.g., mesh of powder representation), such as by being deleted from the calculations of the structural analysis. The structural analysis still considers the thermal loads of the full build and the influence of the powder material in the thermal conduction using the thermal loads determined in the thermal analysis. This methodology results in an accurate and reliable simulation that drastically reduces the computational time.

FIG. 1A shows a method in which these design requirements can be tested relative to a particular design of a system or object which is being simulated. At block 102, a data processing system (e.g., a computer executing simulation software to provide a simulation system) can receive data about a design for a system or object. The data can be created in CAD software on a data processing system, and the data can include geometry information (e.g., sizes and shapes) about the system or object and material information about the material(s) that will be used to manufacture the system or object.

Then at block 104, the data processing system can perform one or more analyses including one or more simulations to evaluate the design of the object (e.g., part) or system (e.g., collection of parts). The simulations may include one or more physics simulations or multiphysics simulations (such as simulations using different physics solvers over different spaces in the simulations). These analyses and simulations can provide results or solution data that can use, or be used in, aspects and embodiments described hereby.

At block 106, the data processing system and/or designer can evaluate the results of one or more analyses/simulations to determine whether the design of the system or object satisfies certain desired criteria for the design. This determination is shown at decision block 108. If the one or more criteria are satisfied, then the data processing system and/or designer at block 112 can provide data about the system or object (including build parameters) to allow the fabrication or manufacture of the system or object. For example, if the one or more criteria are satisfied, a CAD file can be produced that described how to build the system or object, and the system or object can be manufactured based on that CAD file. If the criteria are not satisfied as determined at decision block 108, the data processing system and/or designer can revise the design at block 110 (for example, by changing sizes, spacing, materials, and/or manufacturing parameters used in the system or object, etcetera) and repeat the process by performing additional further analyses and/or simulations to evaluate the redesigned system or object. This can be repeated until the desired criteria are achieved for the system of object.

In various embodiments, one or more manufacturing parameters for actual additive manufacturing of a physical part from a physical powder based on the structural analysis (e.g., part spacing, contactless support thickness, etcetera).

The subject matter described hereby provides many technical advantages. As described hereby, the computer-based techniques of the present disclosure improve the functioning of a computer system as compared to conventional approaches because the techniques described hereby enable analyses (e.g., thermal, structural and/or post-manufacturing analyses) in a manner that is more accurate, reliable, and/or efficient (e.g., faster, with smaller memory and processing requirements) versus conventional approaches. For example, the techniques disclosed hereby can used to reliably, efficiently, and effectively evaluate one or more of hotspots due to proximity between parts, contactless support designs, support-free designs, powder insulation effects in heat treated parts, optimization of process parameters, and part nesting.

The computer-based techniques achieve such improvements while alleviating the need for additional/excessive processing which can be a time-consuming and/or computationally expensive process and may require significant processing and/or memory resources. This is enabled, at least in part, by removing a powder representation from a model used to perform a thermal analysis to produce an updated model and performing a structural analysis with the updated model because excluding the powder representation from the structural analysis can significantly reduce the computing resource demand.

Figure 1B:
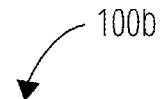
FIG. 1B illustrates an exemplary system for implementing one or more embodiments described hereby.
Figure 1B:
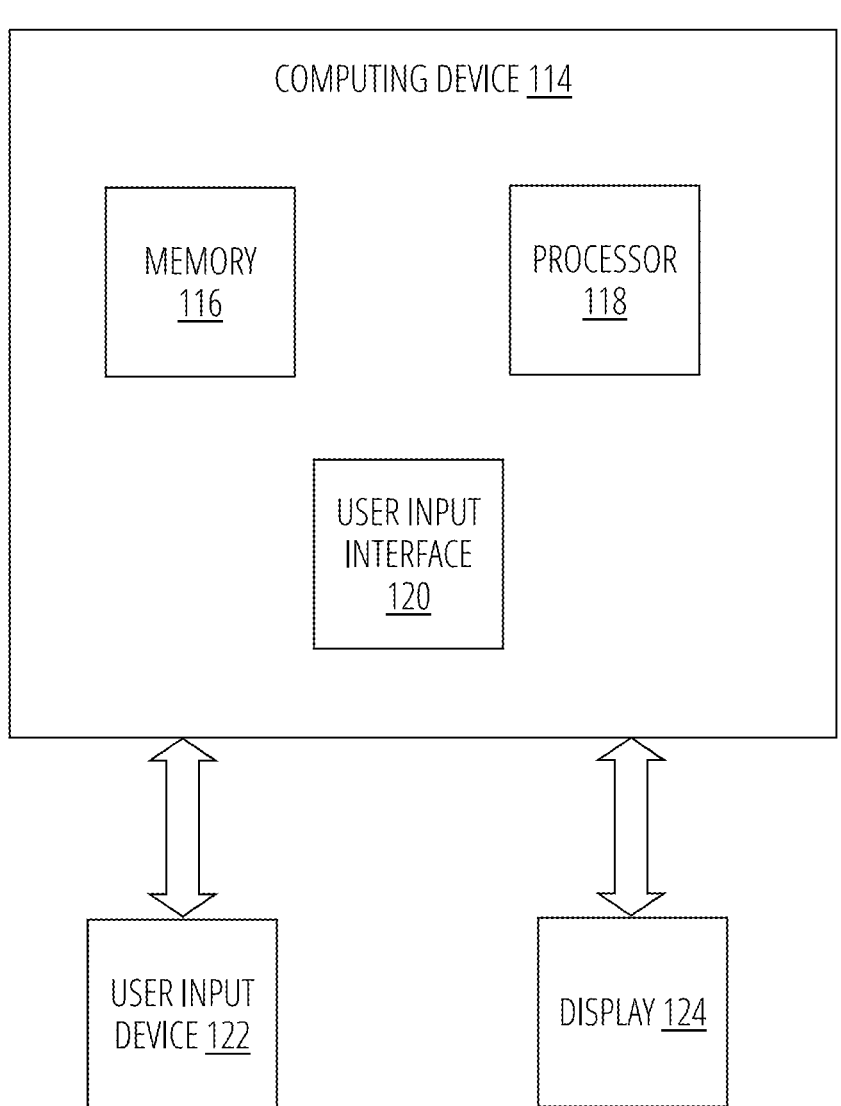

FIG. 1B illustrates a system 100b that can implement one or more techniques disclosed hereby, such as performing various analyses and removing a powder representation from an initial model to produce an updated model. The system 100b can include a computing device 114. The computing device 114 can include memory 116 for storing instructions for execution by one or more data processor/ processor cores 118. The computing device 114 can also include a user input interface 120 that can receive instructions provided by a user input device 122 and/or via a graphical user interface. The system 100b can optionally include a display 124 that can render visual information that corresponds to simulation and/or analysis results.

Figure 2:
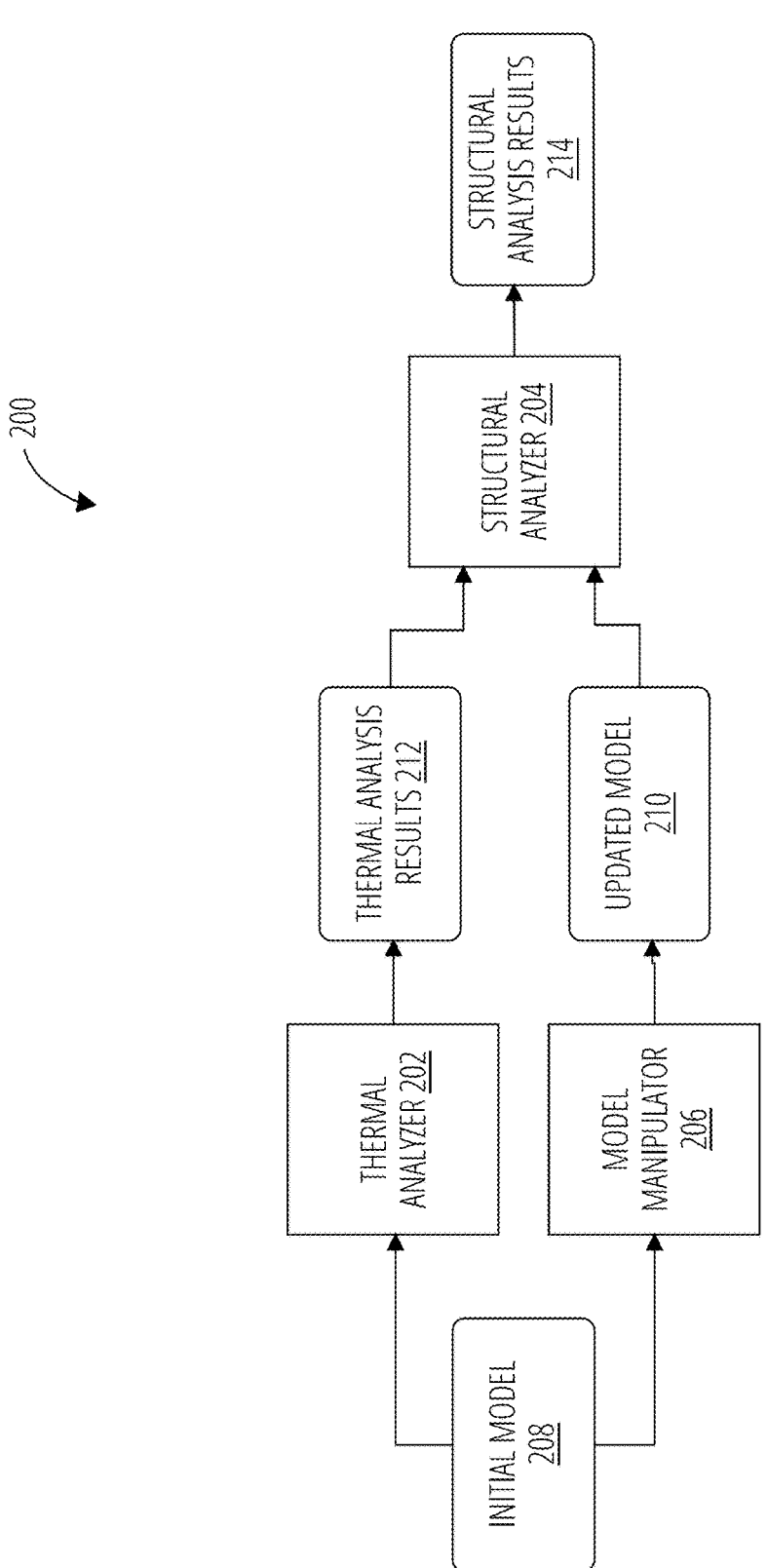
FIG. 2 illustrates various aspects of an exemplary process flow for generating structural analysis results according to one or more embodiments of the current disclosure.

FIG. 2 illustrates various aspects of an exemplary process flow 200 for generating structural analysis results according to one or more embodiments. The illustrated embodiment includes a thermal analyzer 202, a structural analyzer 204, and a model manipulator 206. In process flow 200, the thermal analyzer 202 may receive an initial model 208 as input and generate thermal analysis results 212 as output. The model manipulator 206 may also receive the initial model 208 as input and generate updated model 210 as output. The structural analyzer 204 may receive the thermal analysis results 212, or at least a portion thereof, and the updated model 210 as input and generate the structural analysis results 214 as input. As will be described in more detail below, the initial model 208 may include a powder representation that the model manipulator 206 removes to produce the updated model 210. The thermal analysis results 212 may estimate various thermal characteristics of a physical part manufactured based on the part representation and the structural analysis results 214 may estimate various structural characteristics of the physical part manufactured based on the part representation. In many embodiments, the estimated thermal characteristics may include one or more of thermal loads experienced by the representation of the physical part during the simulated additive manufacturing of the physical part, average temperatures per element layer(s), maximum temperature after printing top layer, and cooling rates. In various embodiments, the estimated structural characteristics may include one or more of deformations and residual stresses. Embodiments are not limited in this context.

More generally, the initial model 208 may include the input provided for performance of the thermal analysis. In many embodiments, the initial model 208 is generated based on a CAD model that is provided as input. For example, and as discussed in more detail below, such as with respect to FIG. 5, the initial model 208 may be the result of simulation setup, meshing, and creating contact definitions after receipt of input comprising a CAD model including the parts, supports, powder representation, and baseplate geometry.

Figure 3A:
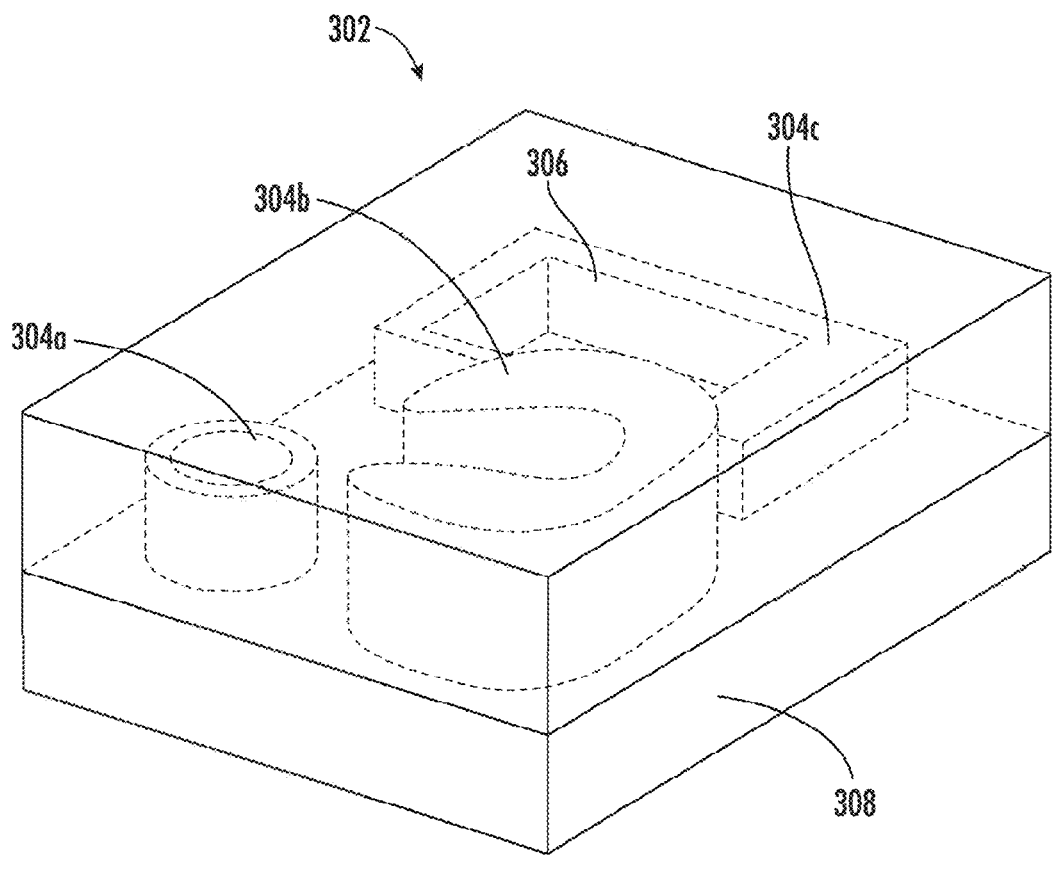
FIG. 3A illustrates various aspects of an initial model according to one or more embodiments of the current disclosure.

FIG. 3A illustrates various aspects of an initial model 302 according to one or more embodiments. In the illustrated embodiment, the initial model 302 includes part representations 304a, 304b, 304c, powder representation 306, and baseplate representation 308. In many embodiments, the initial model 302 may be utilized to perform a thermal analysis of physical parts corresponding to the part representations 304a, 304b, 304c. In many such embodiments, the thermal analysis utilizes the powder representation 306 to account for thermal effects of a corresponding physical powder surrounding and being used to construct the physical part, such as via laser sintering.

In various embodiments, the models discussed herein relate to models used in performing analyses of aspects of an additive manufacturing process and/or additively manufactured part, such as a powder bed fusion process. In powder bed fusion, a first layer of powder is deposited on a baseplate, the first layer of powder is then selectively activated (e.g., via laser) to selectively fuse portions of the first layer to create a first layer of the one or more parts being manufactured. Next, a second layer of powder is deposited on the baseplate on top of the first layer and the processes is repeated until all the layers of the one or more parts being manufactured are completed. In this manner a physical part can be printed from a portion of the physical powder on the baseplate that is activate (e.g., via laser). After manufacturing, the one or more parts can be removed from the remaining unfused powder. In some embodiments, the baseplate may be moved down as additional layers are added.

It will be appreciated that one or more "representations" may be referred to by the name of the component they represent. For example, part representation 304a may be referred to as part 304a and baseplate representation 308 may be referred to as baseplate 308. In the context of discussing a model (e.g., model 602, 702, 802), unless indicated otherwise, reference to a component refers to the representation in the model corresponding to the physical component in the model. For example, part 604a of model 602 refers to a representation in the model 602 of a corresponding physical part.

Figure 3B:
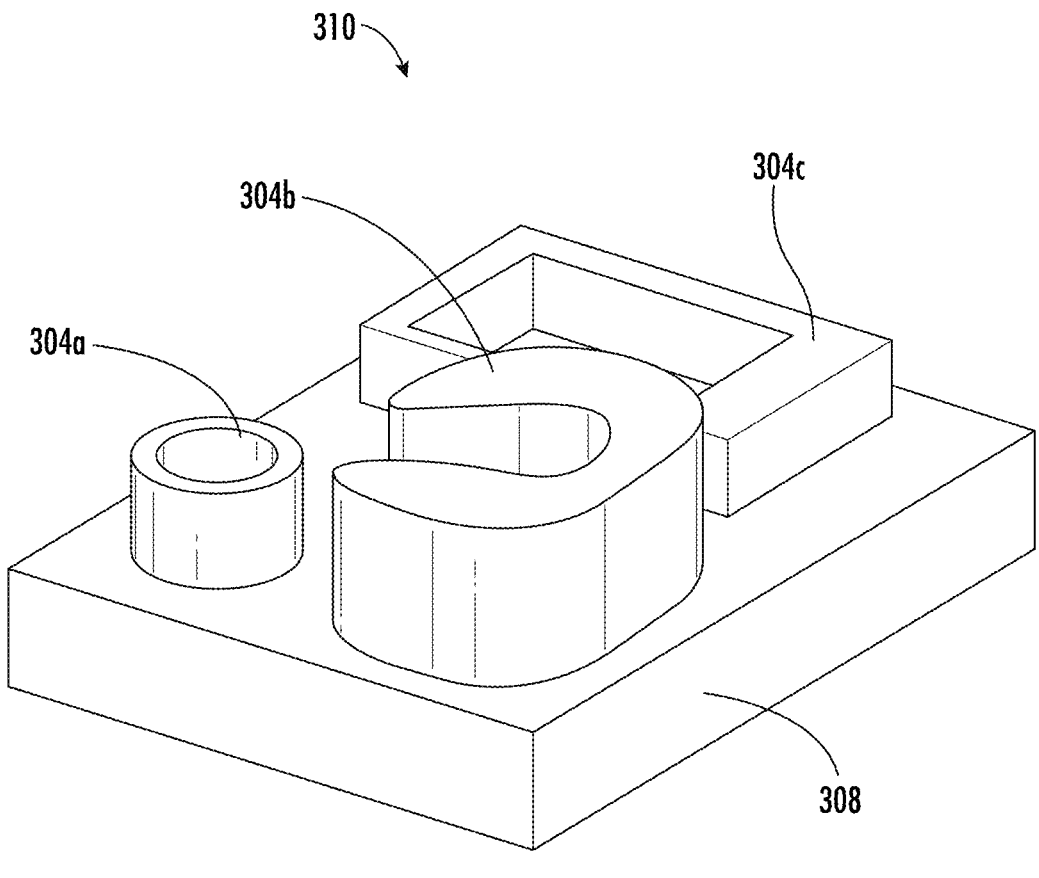
FIG. 3B illustrates various aspects of an updated model according to one or more embodiments of the current disclosure.

FIG. 3B illustrates various aspects of an update updated model 310 according to one or more embodiments. In the illustrated embodiment, the updated model 310 includes part representations 304a, 304b, 304c and baseplate representation 308. In many embodiments, the updated model 310 may be utilized, in conjunction with one or more portions of related thermal analysis results (e.g., from a thermal analysis performed on initial model 302), to perform a structural analysis of the physical parts corresponding to the part representations 304a, 304b, 304c. In many such embodiments, the structural analysis does not utilize the powder representation 306 to enable efficient and accurate generation of structural analysis results.

Figure 4A:
FIG. 4A illustrates exemplary aspects of thermal analysis results according to one or more embodiments of the current disclosure.
Figure 4A:
Figure 4A:
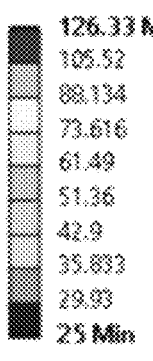
Figure 4A:
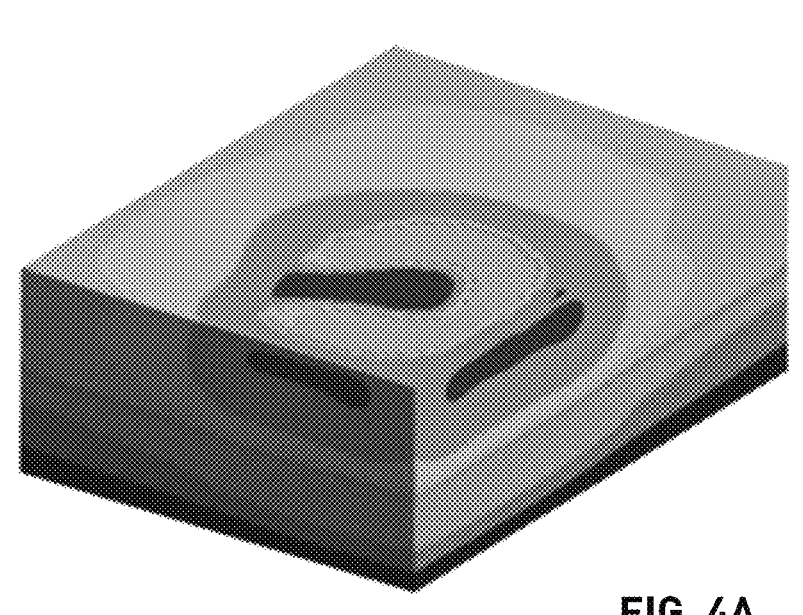

FIG. 4A illustrates exemplary aspects of thermal analysis results 402a according to one or more embodiments. The thermal analysis results 402a depict the maximum temperatures of various portions of the model (e.g., initial model 302) are subjected to during manufacturing. Due to the insulative properties of the powder used in powder bed fusion, accurately performing a thermal analysis of a part manufactured using powder bed fusion needs to take the effects of the powder into account. Accordingly, a model with a powder representation (e.g., initial model 302) is used to produce thermal analysis results 402a that include a powder representation. In some embodiments, thermal analysis results 402a may depict the thermal load of the full build for initial model 302.

Figure 4B:
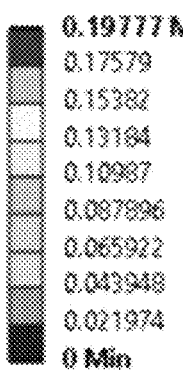
FIG. 4B illustrates exemplary aspects of structural analysis results according to one or more embodiments of the current disclosure.
Figure 4B:
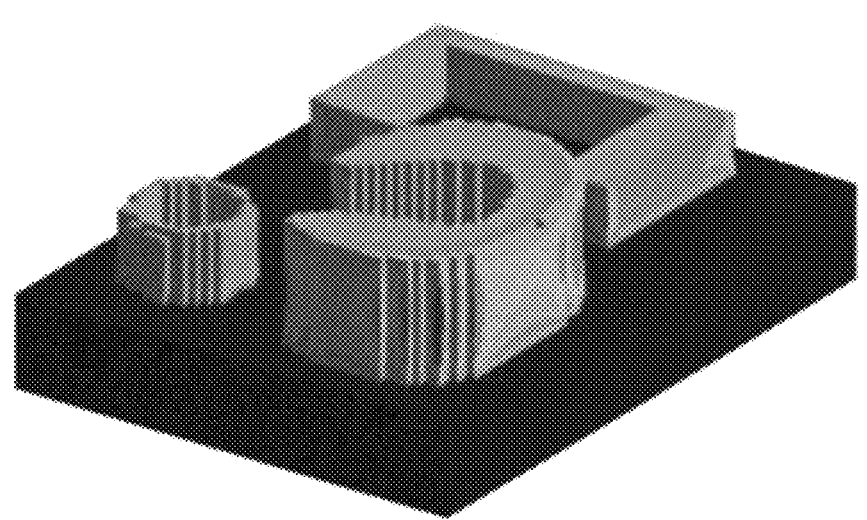

FIG. 4B illustrates exemplary aspects of structural analysis results 402b according to one or more embodiments. The structural analysis results 402b depict the deformations of various portions of the manufactured parts in the model (e.g., updated model 310) due to simulated application of forces during the corresponding structural analysis. As discussed in more detail below, such as with respect to FIGS. 7A-7D, including the powder representation in the structural analysis can over-stiffen parts and lead to unacceptable processing times and resource requirements. Accordingly, a model with no powder representation (e.g., updated model 310) is used to produce structural analysis results 402b that factor in the thermal loads the components are subjected to as determined by the thermal analysis. In many embodiments, the thermal history at each node may be imported from the thermal calculation and considered as a thermal gradient. In many such embodiments, a node may refer to a point in space at which the degrees of freedom are defined.

Figure 5:
FIG. 5 illustrates an exemplary logic flow for performing thermal and structural analyses according to one or more embodiments of the current disclosure.

FIG. 5 illustrates an exemplary logic flow 500 for performing thermal and structural analyses according to one or more embodiments. The logic flow 500 may be representative of a process to solve additive manufacturing structural calculations of parts using the thermal loads of full builds. The logic flow may begin with block 502. At block 502 "receive input" an input is received. For example, parts, supports, powder representation, and baseplate geometry may be provided, such as in a CAD model.

At block 504 "setup simulation" the simulation may be set up. In various embodiments, setup of the simulation may include one or more of using build process parameters for the entire build, assigning materials to different components, and assigning material properties of the powder representation. Continuing to block 506 "create component representations" the component representations may be created based on the input. For example, mesh representations may be generated for the parts, the supports, the powder, and the baseplate geometry.

At block 508 "create contact definitions" contact definitions may be created. For example, contact definitions may be created for one or more of part(s) to supports, part(s) to powder representation, support(s) to powder representation, and parts, supports, powder to baseplate geometry. Continuing to block 510 "perform thermal analysis" a thermal analysis may be performed. For example, a transient thermal analysis for the manufacture of all parts including the powder representation may be solved. In many embodiments, the input provided for performance of the thermal analysis may comprise the initial model (e.g., initial model 208)

At block 512 "remove powder representation" the powder representation may be removed. For example, all powder elements may be deleted prior to performing the structural analysis. In many embodiments, the input provided for performance of the structural analysis after removal of the powder representation may comprise the updated model (e.g., updated models 210). Continuing to block 514 "perform structural analysis" a structural analysis may be performed. For example, a structural analysis that excludes the powder representation may be performed.

Figure 6A:
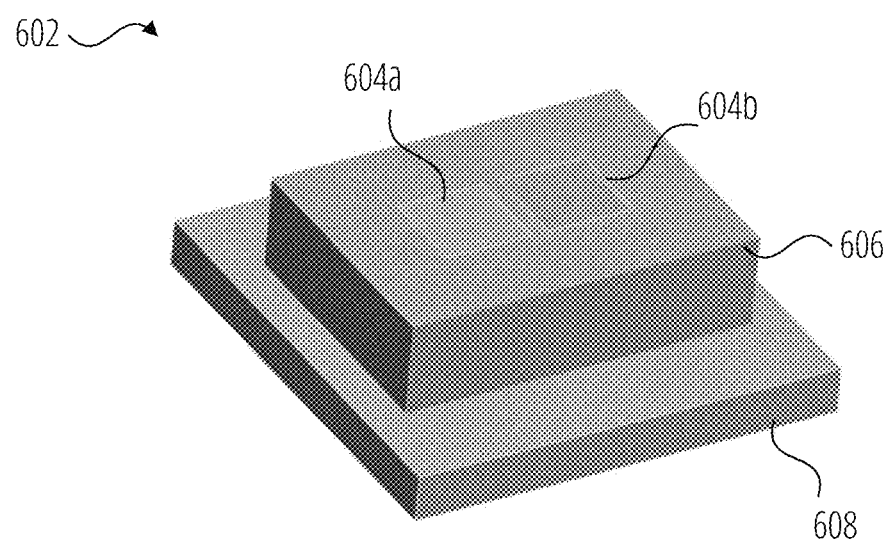
FIGS. 6A-6D illustrate a potential application of disclosed techniques with respect to part proximity according to one or more embodiments.
Figure 6B:
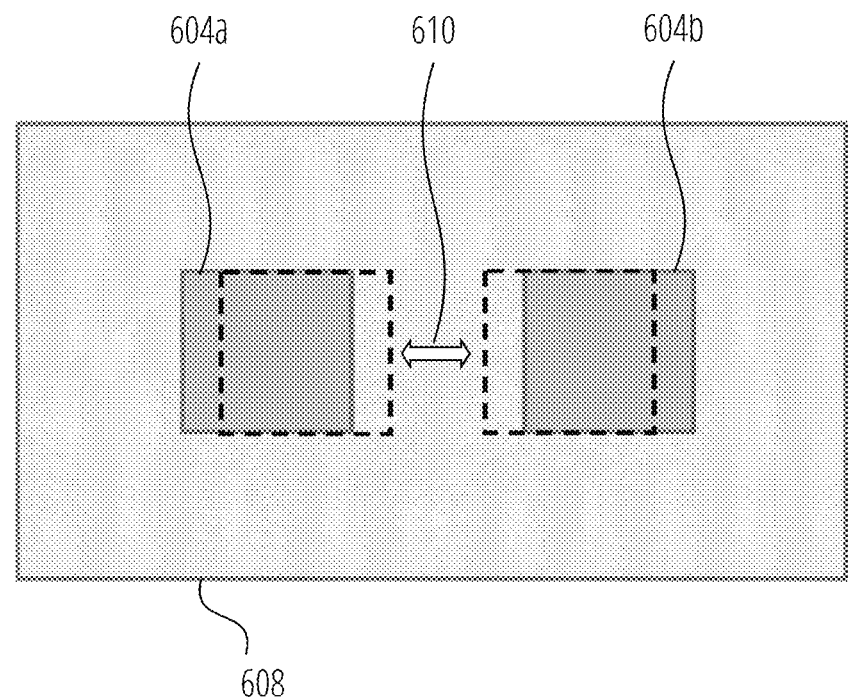
Figure 6C:
Figure 6C:
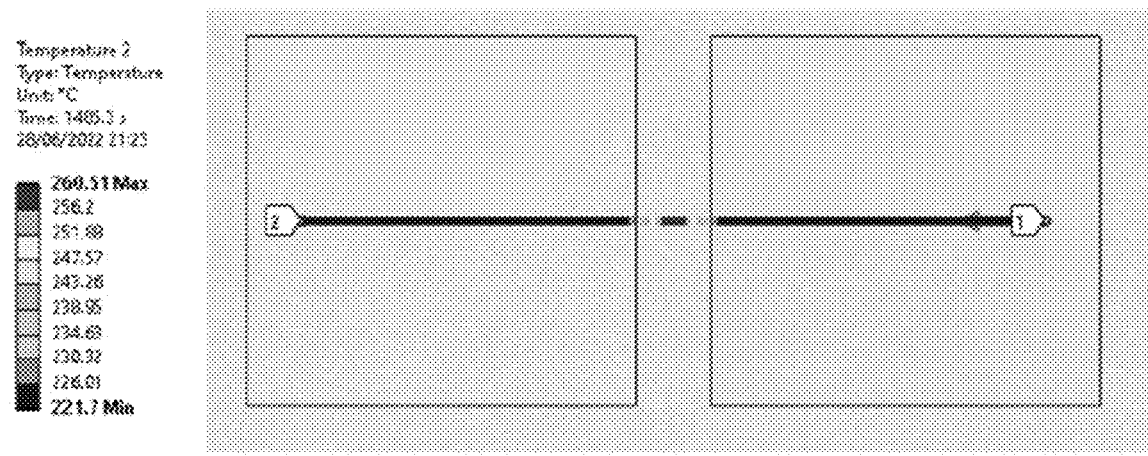

FIGS. 6A-6D illustrate an exemplary application of disclosed techniques with respect to part proximity according to one or more embodiments. More specifically, FIG. 6A illustrates a model 600 including parts 604a, 604b, powder 606, and baseplate 608; FIG. 6B illustrates spacing 610 between part 604a and part 604b; FIG. 6C includes a chart 612 illustrating temperatures of various portions of the model 600 in response to a thermal analysis performed with a specific part spacing; and FIG. 6D includes a chart 614 illustrating different max temperatures resulting from different spacings 610. Various techniques disclosed hereby enable efficient, accurate, and reliable optimization of spacing 610 between different parts. More generally, an accurate and efficient structural analysis facilitates using iteration to optimize a variety of process and/or part parameters. For example, by optimizing the spacing between parts, usage of the area of the baseplate 608 can be optimized to identify the most efficient layout on the baseplate 608.

Referring to FIG. 6A, the model 602 includes part 604a arranged beside part 604b on baseplate 608 with powder 606 surrounding and between parts 604a, 604b. It will be appreciated that powder 606 extending to the edge of baseplate 608 is not illustrated.

FIG. 6B illustrates a top view of the model 602 with variable spacing 610 between the parts 604a, 604b. FIG. 6C illustrates chart 612, which depicts max temperatures resulting from a specific part spacing. The maximum temperature for the specific part spacing is approximately at the center point between the two parts 604a, 604b. This may be due, at least in part, to the insulative properties of the powder and the close proximity of the laser paths utilized to create the sides of parts 604a, 604b facing each other.

Figure 6D:
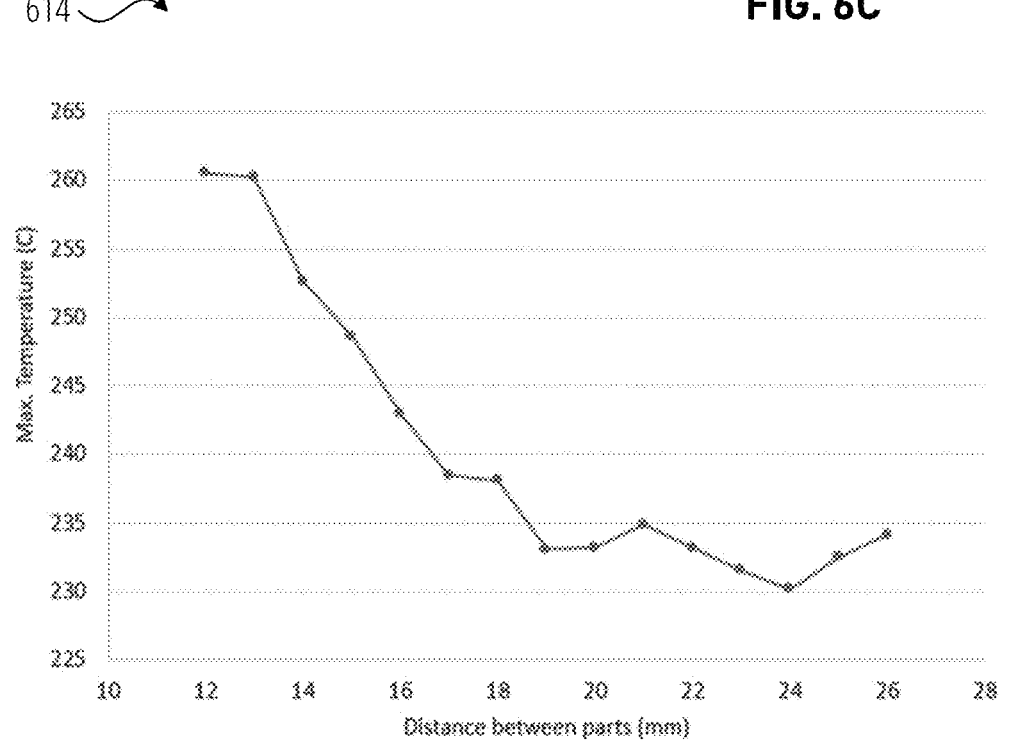

Referring to FIG. 6D, the chart 614 illustrates the relationship between the maximum temperature and the spacing 716 between the parts 604a, 604b. As shown in chart 614, the maximum temperature is the highest with the smallest spacing 610 and decreases as the spacing 610 increases until a threshold spacing is reached. At the threshold spacing (e.g., ~18 mm), the maximum temperature levels off with the temperature remaining stable (e.g., between 230 and 235 degrees). In various embodiments, this threshold spacing may represent an optimal spacing between parts. For example, using a spacing below the threshold may result in parts being subjected to excessively high temperatures and using a spacing above the threshold may result in an inefficient layout (e.g., wasted space) on baseplate 608.

Figure 7A:
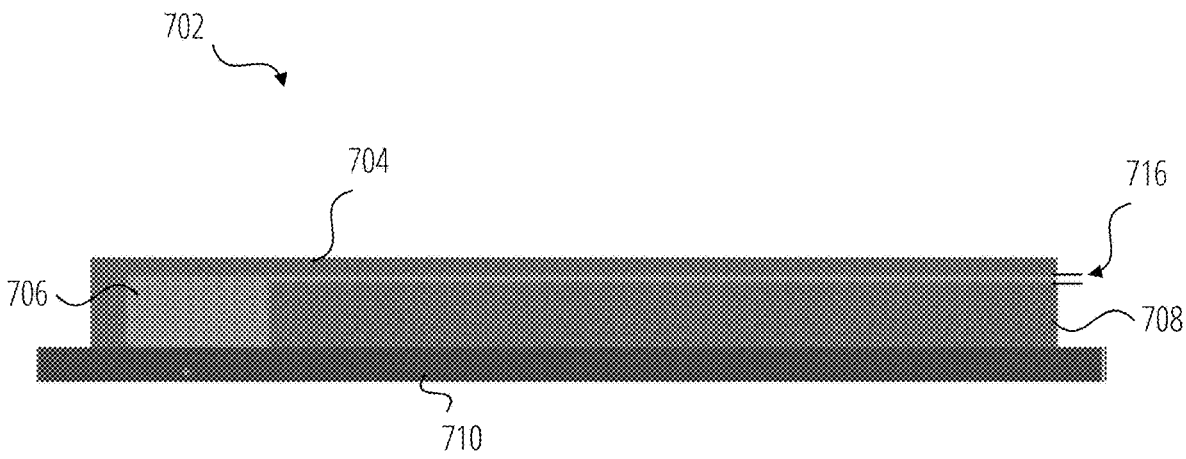
FIGS. 7A-7D illustrate an exemplary application of disclosed techniques with respect to contactless supports according to one or more embodiments of the current disclosure.
Figure 7B:
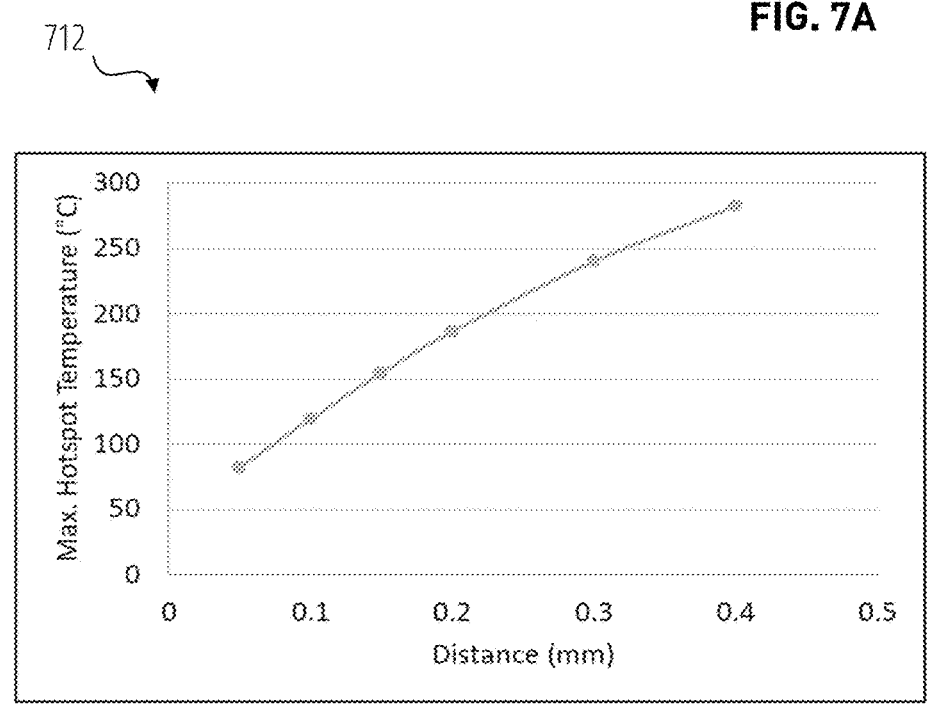
Figure 7C:
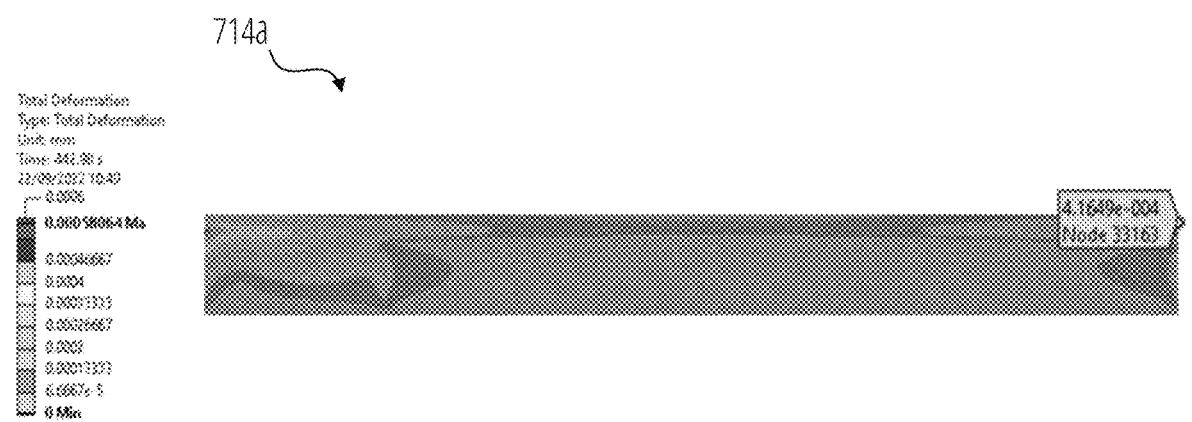

FIGS. 7A-7D illustrate an exemplary application of disclosed techniques with respect to contactless supports according to one or more embodiments. More specifically, FIG. 7A illustrates a model 702 including a part 704, powder 706, support 708, baseplate 710, and spacing 716 between part 704 and support 708; FIG. 7B includes a chart 712 illustrating maximum hotspot temperature versus spacing 716 distance; FIG. 7C includes structural analysis results 714a generated using a model including powder 706; and FIG. 7D includes structural analysis results 714b generated using a model in which powder 706 is excluded. Various techniques disclosed hereby enable efficient, accurate, and reliable optimization of spacing 716 between a support 708 and a powder 706. In many embodiments, the spacing comprises a layer of powder 706. More generally, an accurate and efficient structural analysis facilitates using iteration to optimize a variety of process and/or part parameters.

Referring to FIG. 7A, the model 702 includes support 708, which is a contactless support. In various embodiments, contactless supports may include the use of a layer of powder between a part and a support. Contactless supports may be utilized in powder bed fusion to manufacture parts in a cleaner manner that requires less post processing, such as to remove supports and/or connection points for supports utilized in additive manufacturing of the part. Contactless supports can introduce parameters that can be efficiently and effectively optimized using one or more techniques disclosed hereby. For example, the spacing 716 between the support 708 and the part 704 can be optimized.

Referring to FIG. 7B, the chart 712 illustrates the relationship between the maximum hotspot temperature and the spacing 716 between the support 708 and the part 704. As shown in chart 712, the maximum hotspot temperature increases with increasing the distance between the part 704 and the support 708.

As previously mentioned, including powder representations in structural analyses can result in over-stiffened results that do not accurately reflect part deformation. However, removing the powder representations from the model prior to performing the structural analysis can result in results that accurately reflect part deformation.

Figure 7D:

FIG. 7C illustrates structural analysis results 714a generated using model 702 with powder 706. FIG. 7D illustrates structural analysis results 714b generated using model 702 with powder 706 removed. In structural analysis results 714a, part 704 is deformed by 0.00041649 mm. However, in structural analysis results 714b, part 704 is deformed by 0.25116 mm. Accordingly, structural analysis results 714a illustrate how including powder representations can lead to over-stiffened structural analysis results in which part deformation is poorly estimated. On the other hand, the structural analysis results 714b illustrate how excluding powder representations pursuant techniques disclosed hereby when performing a structural analysis can result in more reliable and efficient results that accurately capture part deformation.

Figures 8A, 8B:
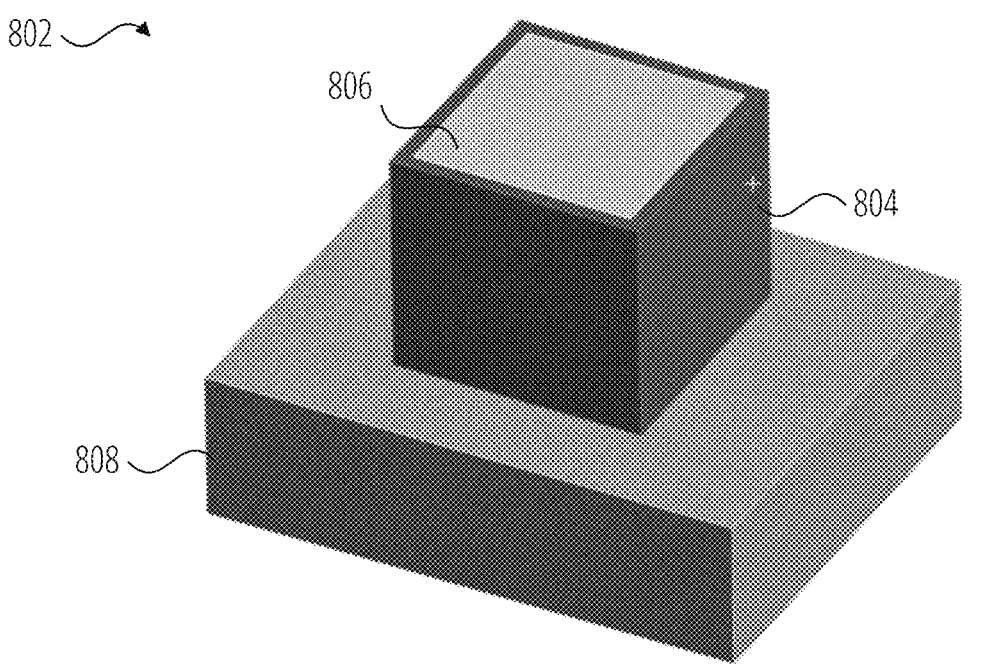
FIGS. 8A-8D illustrate an exemplary application of disclosed techniques with respect to heat treatment analysis according to one or more embodiments of the current disclosure.
Figures 8C, 8D:
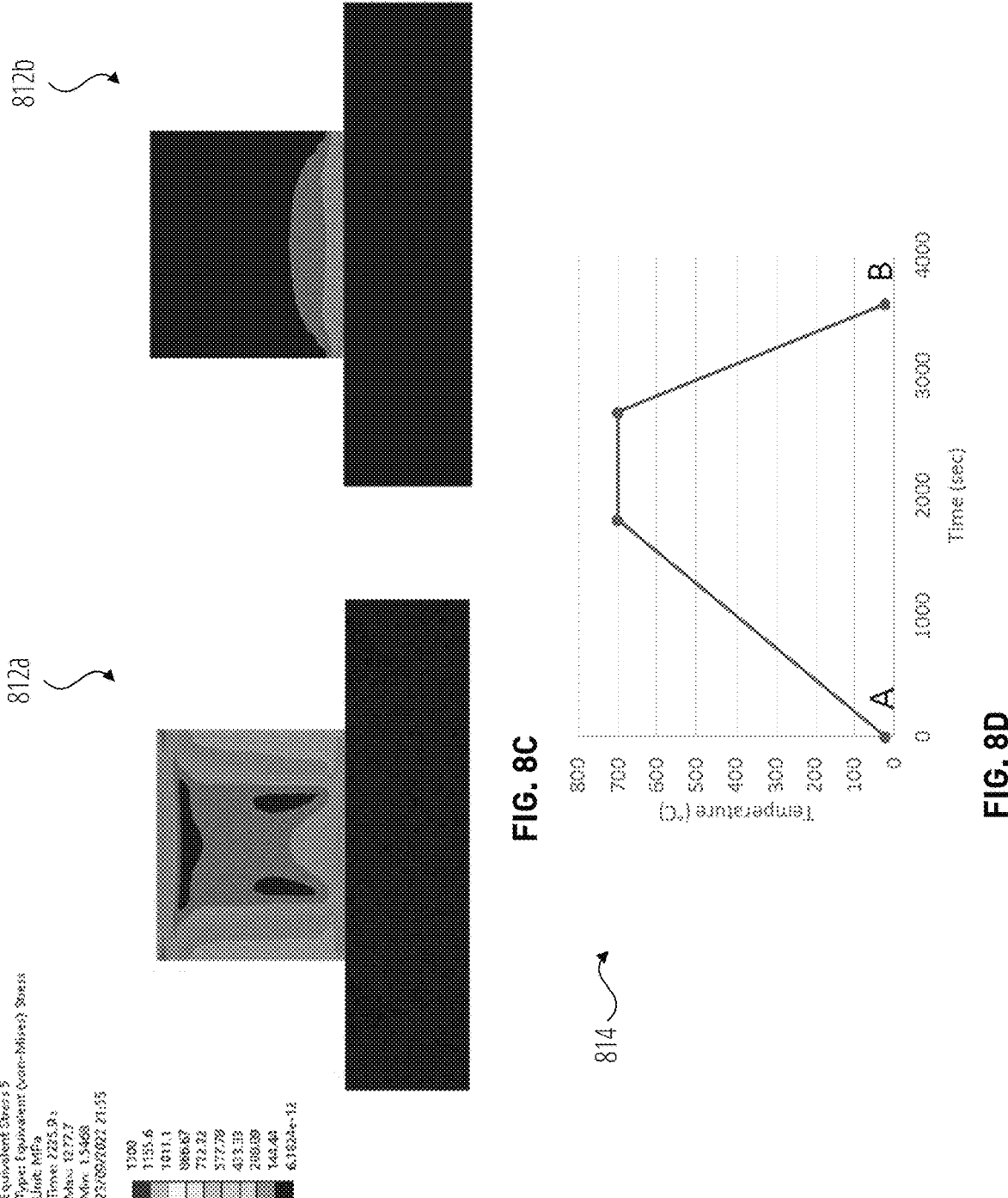

FIGS. 8A-8D illustrate an exemplary application of disclosed techniques with respect to heat treatment analysis according to one or more embodiments. More specifically, FIG. 8A illustrates a model 802 including a part 804, powder 806, and baseplate 808; FIG. 8B includes structural thermal analysis results 810 illustrating maximum temperatures resulting from manufacture of the part 804 at a given time step of the simulation; FIG. 8C includes heat treatment analysis results 812a at the beginning of a simulated heat treatment and heat treatment analysis results 812b at the end of the simulated heat treatment; and FIG. 8D includes a chart 814 that illustrates the input temperature considered for the heat treatment analysis. Various techniques disclosed hereby enable efficient, accurate, and reliable determination of internal stresses after manufacturing (e.g., as part of a structural analysis of the part that is informed by a thermal analysis of the part), which in turn enables simulation of heat treatments with accurate results. More generally, an accurate and efficient structural analysis generated by techniques disclosed hereby can enable accurate simulation and analysis of a variety of post -manufacturing processes without increasing computational time.

Referring to FIG. 8A, the model 802 includes part 804 surrounding powder 806. It will be appreciated that powder 806 surrounding the exterior of the part 804 and extending to the edge of baseplate 808 is not illustrated.

FIG. 8B illustrates thermal analysis results 810 generated based on model 802. These thermal analysis results 810 may be utilized to inform a structural analysis of the part 804. More specifically, the temperatures different portions of the part 804 were subjected to during manufacturing may be utilized in determining internal stresses of the part 804.

Referring to FIG. 8C, heat treatment analysis results 812a are from the beginning of the simulated heat treatment and heat treatment analysis results 812b are from the end of the heat treatment. More specifically, heat treatment analysis results 812a illustrate the internal stresses of part 804 subsequent to simulated additive manufacturing and heat treatment analysis results 812b illustrate the internal stresses of part 804 after the heat treatment. Various techniques disclosed hereby enable efficient, accurate, and reliable simulation of heat treatments via an efficient, accurate, and reliable structural analysis informed by an efficient, accurate, and reliable thermal analysis. More generally, an efficient and accurate structural analysis generated by techniques disclosed hereby can enable accurate simulation and analysis of a variety of post-manufacturing processes.

Referring to FIG. 8D, the chart 814 illustrates the input temperature considered for the heat treatment analysis. In some embodiments, the heat treatment may comprise an annealing processes. For example, the annealing process may alter physical and/or chemical properties of a material to increase its ductility and reduce its hardness, making it more workable. Typically, annealing involves heating a material above a recrystallization temperature, maintaining a suitable temperature for an appropriate amount of time, and then cooling.

The methods and systems described herein may be implemented using any suitable processing system with any suitable combination of hardware, software, and/or firmware, such as described below with reference to the non-limiting examples of FIG. 9, FIG. 10A, FIG. 10B, and FIG. 10C.

Figure 9:
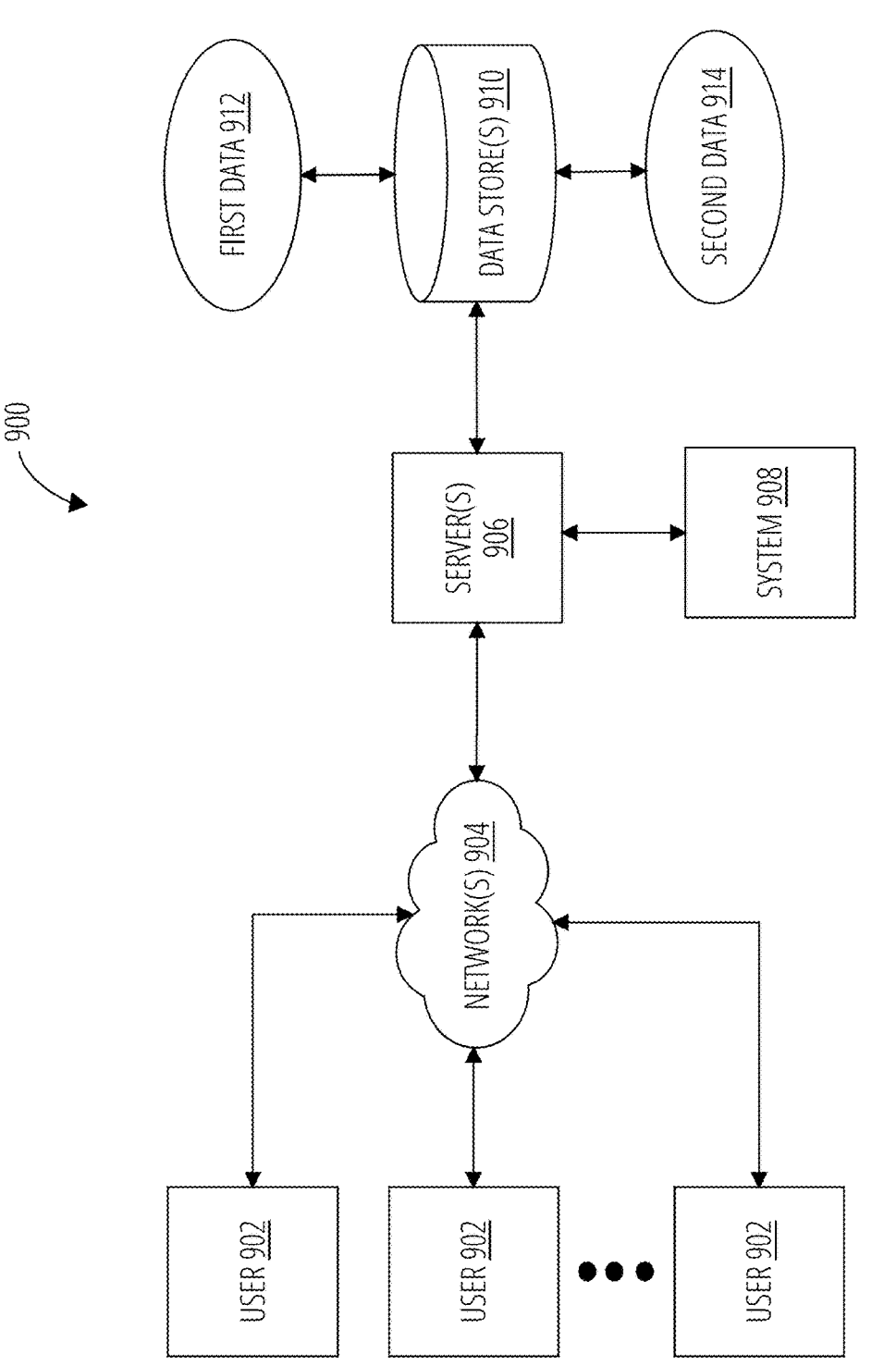
FIG. 9 illustrates an exemplary system which may be used in conjunction with one or more embodiments described hereby.

FIG. 9 depicts a computer-implemented environment 900 wherein users 902 can interact with a system 908 hosted on one or more server(s) 906 through one or more network(s) 904. The one or more server(s) 906 are coupled to one or more data store(s) 910. In some embodiments, the one or more data store(s) 910 are coupled to the one or more server(s) 906 via the one or more network(s) 904. The data store(s) 910 can store data utilized by the system 908, such as first data 912 and second data 914 The system 908 contains software operations or routines. The users 902 can interact with the system 908 through a number of ways, such as over one or more network(s) 904. One or more server(s) 906 accessible through the network(s) 904 can host system 908. It should be understood that the system 908 could also be provided on a stand-alone computer for access by a user.

Figure 10A:
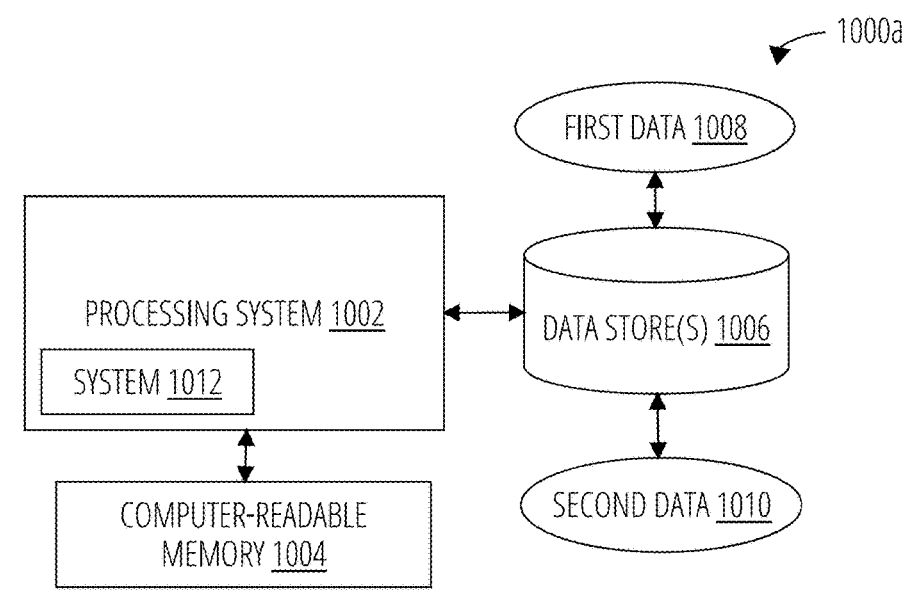
FIGS. 10A-10C illustrate exemplary system which may be used in conjunction with one or more embodiments described hereby.
Figure 10B:
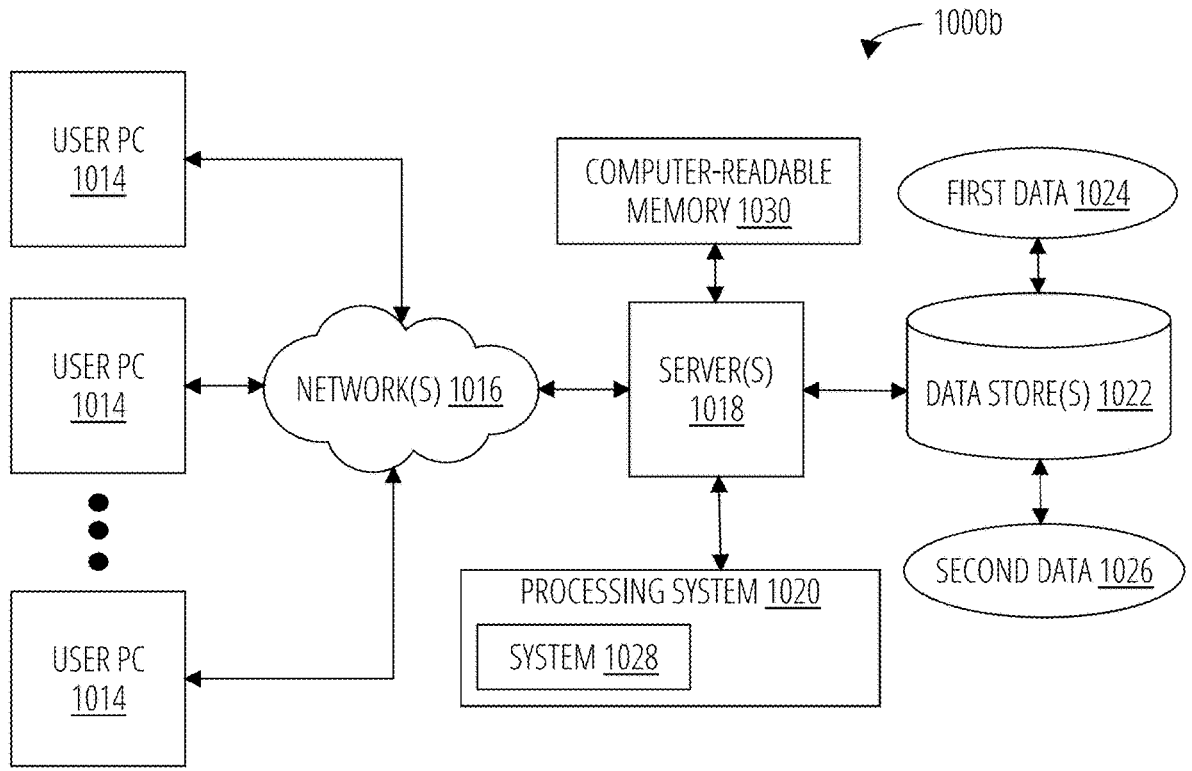
Figure 10C:
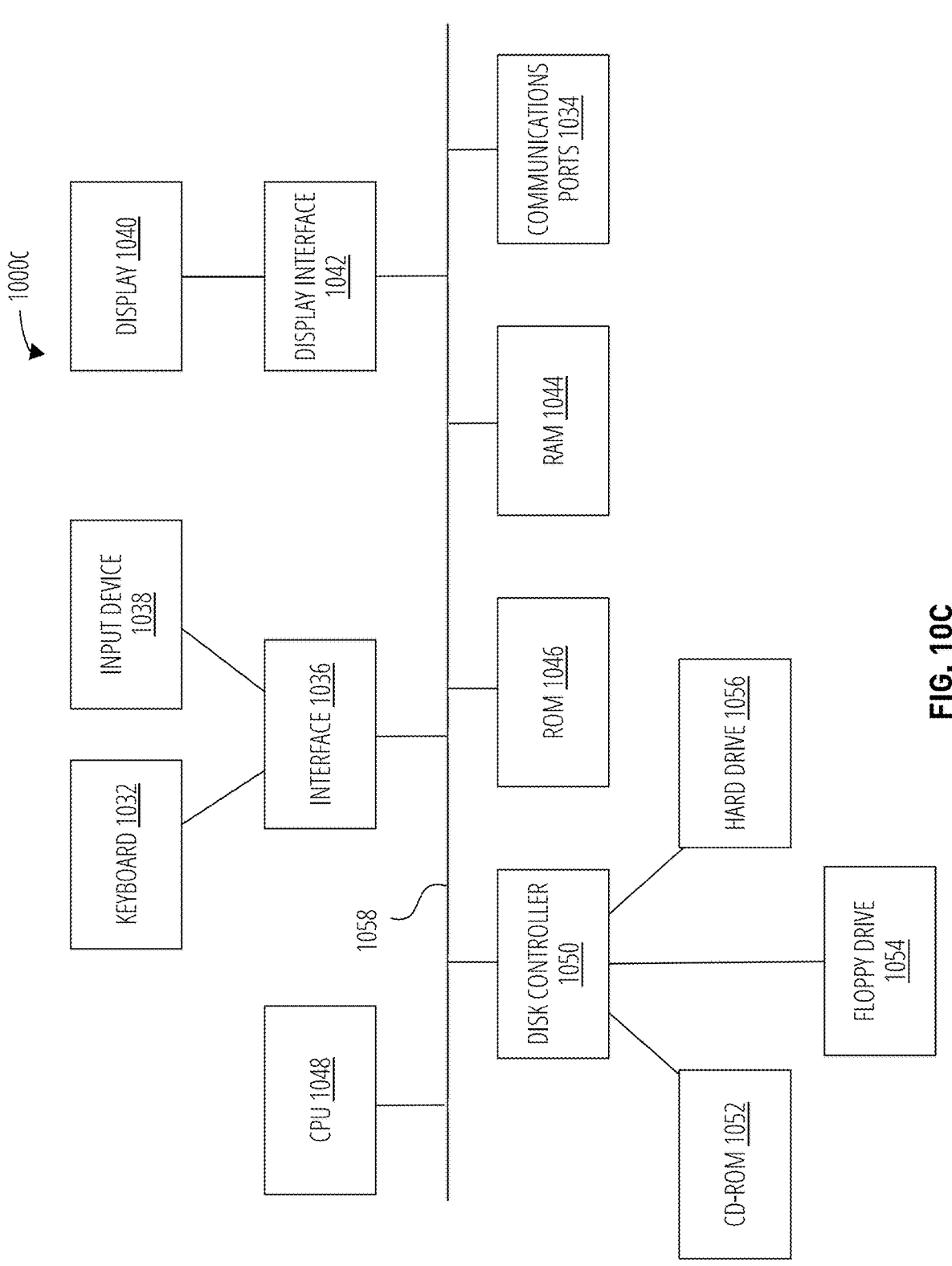

FIGS. 10A-10C depict example systems for use in implementing a system. For example, FIG. 10A depicts an exemplary system 1000a that includes a standalone computer architecture where a processing system 1002 (e.g., one or more computer processors located in a given computer or in multiple computers that may be separate and distinct from one another) includes a system 1012 (e.g., one or more of thermal analyzer 202, structural analyzer 204, and model manipulator 206) being executed on it. The processing system 1002 has access to a non-transitory computer-readable memory 1004 in addition to one or more data store(s) 1006. The one or more data store(s) 1006 may contain first data 1008 (e.g., an initial model 208 and/or an updated model 210) as well as second data 1010 (e.g., thermal analysis results 212 and/or structural analysis results 214). The processing system 1002 may be a distributed parallel computing environment, which may be used to handle very large-scale data sets.

FIG. 10B depicts a system 1000b that includes a client server architecture. One or more user PCs 1014 access one or more server(s) 1018 running a system 1028 (e.g., one or more of thermal analyzer 202, structural analyzer 204, and model manipulator 206) on a processing system 1020 via one or more network(s) 1016. The one or more server(s) 1018 may access a non-transitory computer-readable memory 1030 as well as one or more data store(s) 1022. The one or more data store(s) 1022 may contain first data 1024

(e.g., an initial model 208 and/or an updated model 210) as well as second data 1026 (e.g., thermal analysis results 212 and/or structural analysis results 214).

FIG. 10C shows a block diagram of exemplary hardware for a standalone computer architecture 1000c, such as the architecture depicted in FIG. 10A, that may be used to contain and/or implement the program instructions of system embodiments of the present disclosure. A system bus 1058 may serve as the information highway interconnecting the other illustrated components of the hardware. A processing system 1048 labeled CPU (central processing unit) (e.g., one or more computer processors), may perform calculations and logic operations required to execute a program. A non-transitory computer-readable storage medium, such as read only memory (ROM) 1046 and random-access memory (RAM) 1044, may be in communication with the CPU 1048 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1050 interfaces one or more optional disk drives to the system bus 1058 These disk drives may be external or internal floppy disk drives such as floppy drive 1054, external or internal CD-ROM, CD-R, CD-RW, or DVD drives such as 1052. As indicated previously, these various disk drives and disk controllers are optional devices. One or more of the components described hereby may include a software application stored in one or more of the disk drives connected to the disk controller 1050, the ROM 1046, and/or the RAM 1044. In various embodiments, the CPU 1048 may access each component as required.

A display interface 1042 may permit information from the system bus 1058 to be displayed on a display 1040 in audio, graphic, or alphanumeric format. Communication with external devices may optionally occur using various communications ports 1034.

The hardware may also include data input devices, such as keyboard 1032 and one or more other input devices 1038, such as a microphone, remote control, pointer, mouse, touchscreen, and/or joystick.

This written description describes exemplary embodiments, but other variations fall within scope of the disclosure. For example, the systems and methods may include and utilize data signals conveyed via networks (e.g., local area network, wide area network, internet, combinations thereof, etcetera), fiber optic medium, carrier waves, wireless networks, etcetera for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etcetera, as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etcetera) may be stored and implemented in one or more different types of computer-implemented data stores, such as different types of storage devices and programming constructs (e.g., RAM, ROM, flash memory, flat files, databases, programming data structures, programming variables, IF-THEN (or similar type) statement constructs, etcetera). It is noted that data structures describe formats for use in organizing and storing data in databases, programs, memory, or other non-transitory computer-readable media for use by a computer program.

The computer components, software modules, functions, data stores, and data structures described herein may be connected directly or indirectly to each other in order to allow the flow of data needed for their operations. It is also noted that a module or processor includes but is not limited to a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus, and/or device, such as for example magnetic disks, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In the descriptions above and in the claims, phrases such as "at least one of" or "one or more of" may occur followed by a conjunctive list of elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described hereby. Instead, they are merely some examples consistent with aspects related to the described subject matter. Although a few variations have been described in detail above, other modifications and/or additions are possible. In particular, further features and/or variations can be provided in addition to those set forth herein. For example, the implementations described above can be directed to various combinations and sub combinations of the disclosed features and/or combinations and sub combinations of several further features disclosed hereby. In addition, the logic flows depicted in the accompanying figures and/or described herein do not necessarily require the particular order shown, or sequential order, to achieve desirable results. Other implementations may be within the scope of the following claims.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include bother the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission, or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description. In addition, the disclosure is not described with reference to any particular programming language. It will be appreciated that a variety of programming languages may be used to implement the teachings of the disclosure as described hereby.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method for thermomechanical modeling (TM) simulations, comprising:

performing a thermal analysis for simulated additive manufacturing of a physical part from a physical powder using powder bed fusion (PBF), the thermal analysis based on a model of the PBF, the model including representations of the physical part printed from the physical powder and remaining physical powder not printed in the simulated additive manufacturing, the thermal analysis providing thermal characteristics for the physical part;

deleting the representation of the remaining physical powder from the model to produce an updated model of the PBF, the updated model of the PBF including a representation of the physical part associated with the thermal characteristics; and performing a structural analysis for the physical part associated with the thermal characteristics utilizing the updated model to determine structural properties of the physical part.

2. The computer-implemented method of claim 1, comprising setting one or more manufacturing parameters for actual additive manufacturing of the physical part from the physical powder using PBF based on the structural analysis.

3. The computer-implemented method of claim 2, wherein the physical part comprises a first physical part and the one or more manufacturing parameters set for actual additive manufacturing of the physical part includes a spacing between the first physical part and a second physical part additively manufactured with the first physical part.

4. The computer-implemented method of claim 2, wherein the one or more manufacturing parameters set for actual additive manufacturing of the physical part includes a thickness of a contactless support, wherein the contactless support is composed of a portion of the physical powder.

5. The computer-implemented method of claim 4, wherein the thermal characteristics provided by the thermal analysis includes thermal loads experienced by the representation of the physical part during the simulated additive manufacturing of the physical part.

6. The computer-implemented method of claim 1, wherein the structural analysis is performed based on at least a portion of results from the thermal analysis.

7. The computer-implemented method of claim 1, wherein the representation of the remaining physical powder comprises a mesh representation and the mesh representation is deleted to produce the updated model.

8. The computer-implemented method of claim 1, wherein the updated model includes the representation of the physical part printed from the physical powder.

9. An apparatus, comprising:
   memory storing instructions; and
   one or more processor coupled to the memory, the one or more processors executing the instructions from memory, the one or more processors configured to perform a method including:
      performing a thermal analysis for simulated additive manufacturing of a physical part from a physical powder using powder bed fusion (PBF), the thermal analysis based on a model of the PBF, the model including representations of the physical part printed from the physical powder and remaining physical powder not printed in the simulated additive manufacturing, the thermal analysis providing thermal characteristics for the physical part;
      deleting the representation of the remaining physical powder from the model to produce an updated model of the PBF, the updated model of the PBF including a representation of the physical part associated with the thermal characteristics; and
      performing a structural analysis for the physical part associated with the thermal characteristics utilizing the updated model to determine structural properties of the physical part.

10. The apparatus of claim 9, wherein the one or more processors are further configured to perform the method including setting one or more manufacturing parameters for actual additive manufacturing of the physical part from the physical powder using PBF based on the structural analysis.

11. The apparatus of claim 10, wherein the physical part comprises a first physical part and the one or more manufacturing parameters set for actual additive manufacturing of the physical part includes a spacing between the first physical part and a second physical part additively manufactured with the first physical part.

12. The apparatus of claim 10, wherein the one or more manufacturing parameters set for actual additive manufacturing of the physical part includes a thickness of a contactless support, wherein the contactless support is composed of a portion of the physical powder.

13. The apparatus of claim 9, wherein the structural analysis is performed based on at least a portion of results from the thermal analysis.

14. The apparatus of claim 13, wherein the portion of results from the thermal analysis includes thermal loads experienced by the representation of the physical part during the simulated additive manufacturing of the physical part.

15. The apparatus of claim 9, wherein the representation of the remaining physical powder comprises a mesh representation and the mesh representation is deleted to produce the updated model.

16. The apparatus of claim 9, wherein the updated model includes the representation of the physical part printed from the physical powder.

17. At least one non-transitory computer-readable medium storing executable program instructions which when executed by a data processing system cause the data processing system to perform a method, the method comprising:
   performing a thermal analysis for simulated additive manufacturing of a physical part from a physical powder using powder bed fusion (PBF), the thermal analysis based on a model of the PBF, the model including representations of the physical part printed from the physical powder and remaining physical powder not printed in the simulated additive manufacturing, the thermal analysis providing thermal characteristics for the physical part;
   deleting the representation of the remaining physical powder from the model to produce an updated model of the PBF, the updated model of the PBF including a representation of the physical part associated with the thermal characteristics; and
   performing a structural analysis for the physical part associated with the thermal characteristics utilizing the updated model to determine structural properties of the physical part.

18. The at least one non-transitory computer-readable medium of claim 17, wherein the structural analysis is performed based on at least a portion of results from the thermal analysis.

19. The at least one non-transitory computer-readable medium of claim 18, wherein the portion of results from the thermal analysis includes thermal loads experienced by the representation of the physical part during the simulated additive manufacturing of the physical part.

20. The at least one non-transitory computer-readable medium of claim 17, wherein the representation of the remaining physical powder comprises a mesh representation and the mesh representation is deleted to produce the updated model.

* * * * *